UNITED STATES PATENT OFFICE.

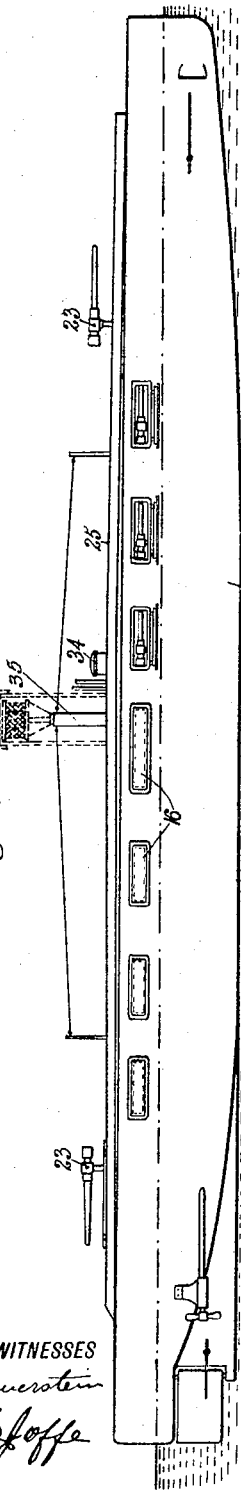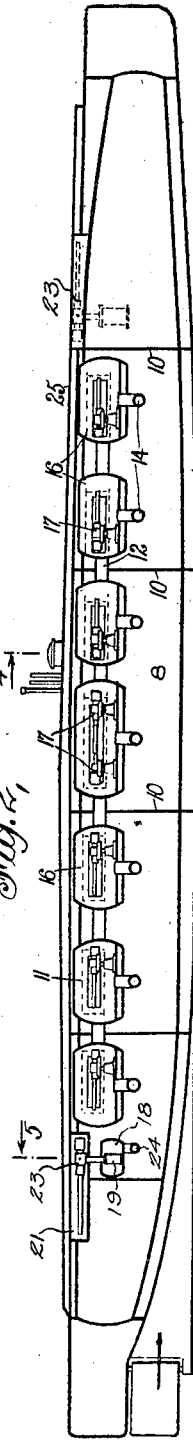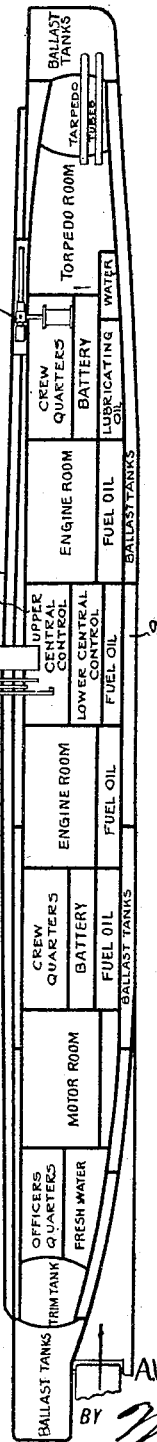

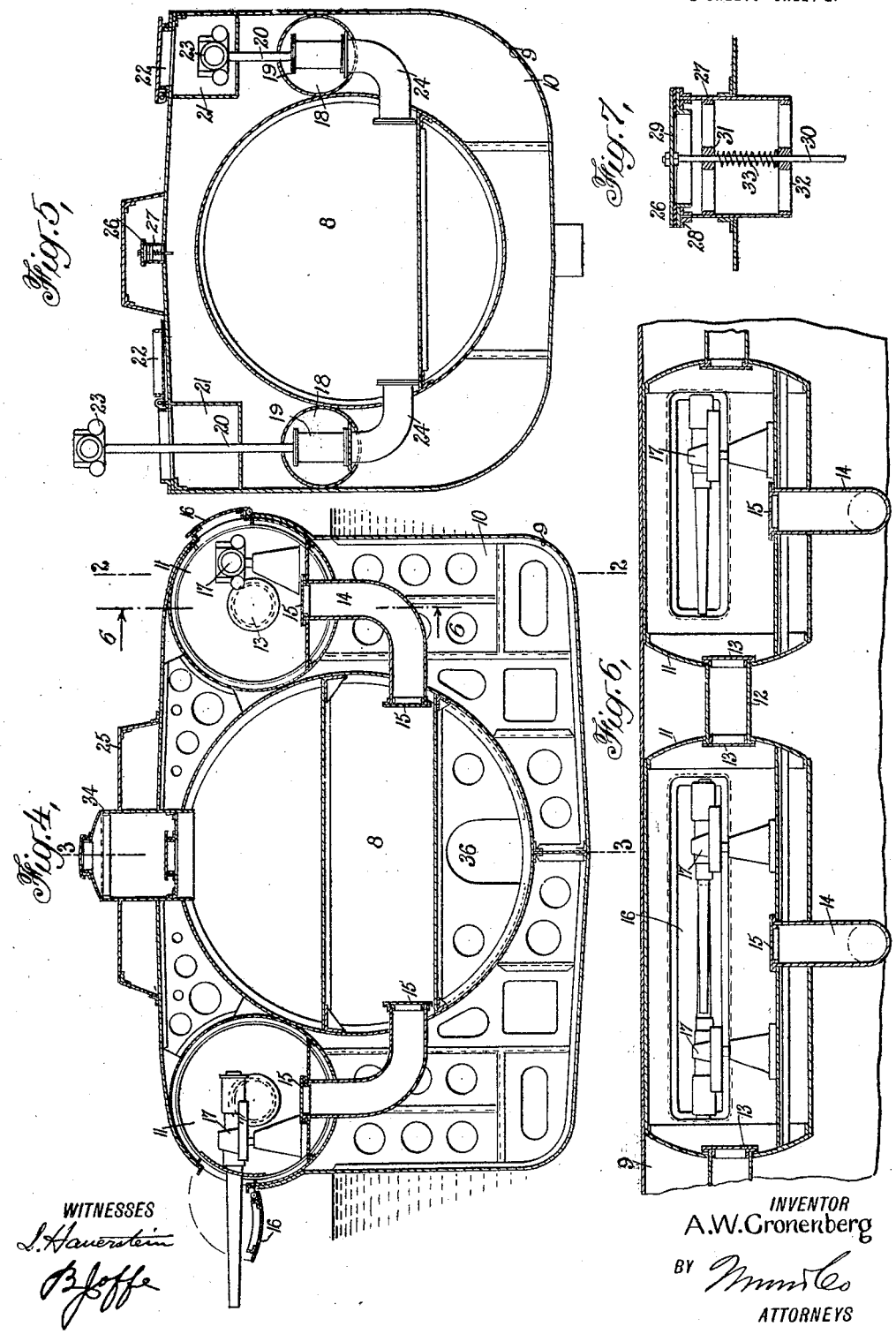

AUGUST WILLIAM CRONENBERG, OF WESTPORT, CONNECTICUT.

SUBMARINE BATTLESHIP.

1,324,880.   Specification of Letters Patent.   Patented Dec. 16, 1919.

Application filed September 11, 1917. Serial No. 190,806.

*To all whom it may concern:*

Be it known that I, AUGUST WILLIAM CRONENBERG, a citizen of the United States, and a resident of Westport, in the county of Fairfield and State of Connecticut, have invented a new and Improved Submarine Battleship, of which the following is a full, clear, and exact description.

The invention relates to a type of vessel which is capable of partial or total submergence in water.

An object of the invention is to provide a submergible having disappearing guns and mechanism for operating the same.

Another object of the invention is to provide a submergible having water-tight compartments adapted to accommodate ordnance pieces which can be manipulated and discharged from said compartments, the compartments being accessible from the interior of the submergible.

A still further object of the invention is to provide a vessel with a wide beam, thereby providing a large water space amidship of the vessel for resisting the recoil of guns.

Another object of the invention is to separate the vessel into transversely running tanks so both sides of the ship will be at the same level during flooding and draining of the tanks.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a submergible battleship embodying my invention, some of the ordnance compartments being shown open;

Fig. 2 is a diagrammatic section on line 2—2, Fig. 4;

Fig. 3 is a diagrammatic longitudinal section of the ship on line 3—3, Fig. 4;

Fig. 4 is an enlarged cross section on line 4—4, Fig. 2;

Fig. 5 is a similar section on line 5—5, Fig. 2;

Fig. 6 is a fragmentary section on line 6—6, Fig. 4; and

Fig. 7 is an enlarged section through a valve and seat for the ballast tanks.

Referring to the drawings, 8 is the main hull of the ship. It is inclosed within an outer hull 9 substantially through the entire length. The outer hull has the shape of the hull of a battleship, or other shape giving large water space to resist recoil of guns, and is separated by partitions 10 into compartments extending transversely of the ship. Some of the partitions are apertured to establish communication between the adjacent compartments. These apertures have water-tight covers to separate the ballast tanks. As shown in Fig. 4, the outer hull accommodates on each side water-tight compartments 11 disposed near the upper part of the hull in proximity to the main or inner hull. The compartments on each side are spaced from each other and provide a clearance, so that the ballast tank sections above and below may communicate for a better distribution of the ballast. The adjacent water-tight gun compartments 11 are interconnected by tubular sections 12 which are provided with removable covers 13 at each end.

Each of the gun compartments 11 has a tubular passage 14 leading into the main hull 8. Through these passages said compartments are accessible from the main hull. Covers 15 are provided at the ends of the passages 14. In addition, each compartment has an elongated door 16 which closes the compartment hermetically when the vessel is to be submerged. These doors 16 are operable from within and the length and width of same depend on the size of the gun 17 which is mounted therein. The guns in these compartments are to be of a size larger than three inches, preferably of thirty caliber, that is, the guns are of a character larger than those hitherto utilized on this class of battleships. The compartments and their doors must be large enough to accommodate guns, or ordnances, of a suitable size. The gun in said compartments is mounted to swing laterally, and in the inoperative position it extends longitudinally of the compartment. The size of the compartment 11 may be long enough to accommodate two guns, as shown in Fig. 6. It is evident that one gun of large caliber and one of small caliber may be associated, if so desired, in place of providing two guns of the same caliber, as mentioned. The compartments 11 may also be utilized for torpedo tubes for discharge above water level.

Water-tight compartments 18 are provided aft on each side of the main hull within the outer hull and within which lifting jacks 19 are provided, the piston rods 20 of which enter into compartments 21 which are at the top of the outer hull and have a cover 22 at the top. This cover may be hermetically closed when the ship submerges. Within the compartments 21 guns 23 are provided which are carried by the piston rods 20 and whereby the same may be raised or lowered as shown in Fig. 5. Similar compartments 21 can be installed at the forward end of the ship and guns 23 mounted therein, as shown in Figs. 1, 2 and 3. It will be noted that the compartments 18 are accessible from the main hull through tubular passages 24 similar to passages 14.

The outer hull is provided with a superstructure 25 which is not water-tight and in which valves 26 are accommodated. These valves 26 comprise a tubular body 27 which forms a seat 28 at the upper end of same. The valve 29 proper has a stem 30 passing through stationary spiders 31 and 32 secured to the body 27. A spring 33 is provided on the stem which normally tends to force the valve 29 on the seat 28. The valve 29 is drawn tightly against its seat when the ballast tanks are pumped out, that is, when the submergible is caused to rise. On the other hand, the ballast tanks are filled by letting air escape through the valves 29; and as soon as the pressure within the tank is balanced with that of the surrounding medium, the coil spring 33 will seat the valve 29.

A conning-tower 34 extends from the inside of the main hull to a point sufficiently above the superstructure 25 to allow the eye ports to be fitted so the ship can be operated from within. It is located over the central control compartment. Midships a telescoping mast 35 is provided. It has a crow's nest wherefrom the gun-firing may be controlled. A water-tight tube is provided to house the mast when the ship is submerged. This mast may be operated by a jack, or a mechanical arrangement may be provided, if so desired.

The water-tight compartments 11 are capable of holding a gun crew when submerged, thereby providing additional room for the crew of the submergible. As previously mentioned, the access to said compartments or tanks is from the main hull 8. The fuel tanks 36 are located in the lower part of the main or inner hull 8. These tanks extend only longitudinally of the main hull, while the tanks 10 have ballast surrounding entirely the main hull and, therefore, extending transversely of the outer hull. This gives better stability when the outer hull is drained or flooded.

I claim:

1. A submergible of the class described comprising an inner hull, an outer hull, water-tight compartments in the outer hull disposed longitudinally of the inner hull, and access-giving means from the inner hull to the water-tight compartments, said compartments having side doors adapted to be disposed above the ordinary water-line of the submergible when the same is floating.

2. In a submergible, inner and outer hulls, water-tight compartments in each side of the outer hull, means establishing communication between the compartments on the same side, and access-giving means from each of the compartments to the inner hull, each of said compartments having a door adapted to be disposed above the ordinary water-line of the submergible when the same is floating.

3. In a submergible, an inner hull, an outer hull encompassing the inner hull, water-tight compartments in each side of said outer hull disposed longitudinally of the inner hull, means for establishing communication between the adjacent compartments on the same side of the outer hull, access-giving means from the inner hull to each of the compartments, partitions in said outer hull dividing the same into transverse compartments, ordnance pieces in said water-tight compartments, and doors on the sides of said water-tight compartments adapted to be disposed above the ordinary water-line of the submergible when the same is floating so that the ordnance pieces may be moved out of said doors substantially as and for the purpose set forth.

4. In a submergible of the class described, an inner hull, an outer hull, partitions in the outer hull dividing the same into transverse compartments or ballast tanks, water-tight compartments built into the outer hull in proximity to the top and to each side of the outer hull, said water-tight compartments dividing the compartments of the outer hull into upper and lower parts, means spacing the water-tight compartments on the same side of the outer hull and also establishing communication therebetween, said spacing means forming clearance between adjacent water-tight compartments whereby communication is established between the upper and lower sections of the ballast compartments or tanks in the outer hull, access-giving means from the inner hull to each of the water-tight compartments, a side door for each of the water-tight compartments adapted to be disposed above the ordinary water-line of the submergible when the same is floating, and ordnance pieces in said compartments mounted to move out through the open doors.

5. A submergible having the outline of the hull of a battleship and comprising an outer hull, an inner hull, water-tight compartments in the outer hull accessible from the inner hull, ordnance pieces mounted in said water-tight compartments to move outwardly of same, and doors for said compartments through which ordnance pieces are adapted to be moved.

6. In a submergible, an outer hull, an inner hull, superposed water-tight compartments in the outer hull, means giving access from the inner hull to the lower compartments, an ordnance piece in the upper compartment, lifting means in the lower compartment connected to the ordnance piece whereby the same may be moved from the outer compartment, and a door for the upper compartment through which the ordnance pieces may be moved.

7. A submergible in the shape of the hull of a battleship comprising an outer hull, an inner hull, water-tight compartments in the outer hull adapted to be disposed above the ordinary water-line of the submergible when the same is floating, said compartments having side doors opening outwardly through which ordnance pieces may protrude, ordnance pieces mounted movably in said compartments, and access-giving means from the inner hull to said water-tight compartments.

8. In a submergible, an outer hull, an inner hull, water-tight compartments in the outer hull, ordnance pieces in said compartments of a size larger than three inches, and access-giving means from the inner hull to the water-tight compartments for manipulating said guns, said compartments having doors through which the ordnance pieces may protrude when the submergible is afloat.

AUGUST WILLIAM CRONENBERG.